March 8, 1966   H. P. SHERLOCK   3,239,125
SOLDER RING
Filed Dec. 20, 1963   2 Sheets-Sheet 1

INVENTOR.
HUGH PAUL SHERLOCK
BY
ATTORNEYS

March 8, 1966 H. P. SHERLOCK 3,239,125
SOLDER RING
Filed Dec. 20, 1963 2 Sheets-Sheet 2
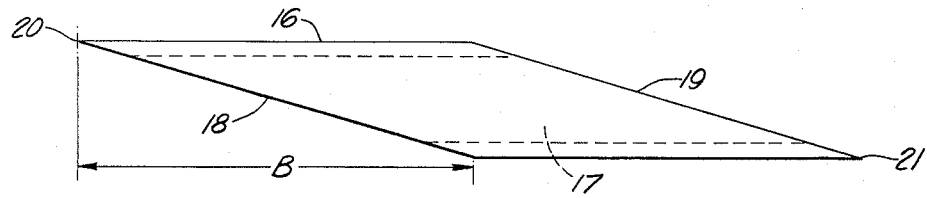
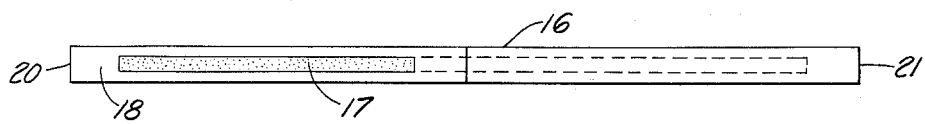
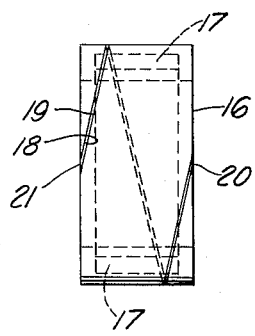
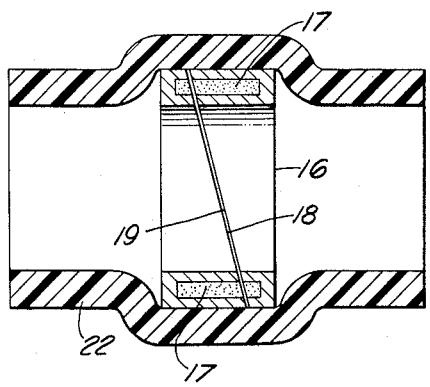
INVENTOR.
HUGH PAUL SHERLOCK
BY
ATTORNEYS United States Patent Office 3,239,125
Patented Mar. 8, 1966

3,239,125
SOLDER RING
Hugh Paul Sherlock, Menlo Park, Calif., assignor to Raychem Corporation, Redwood City, Calif., a corporation of California
Filed Dec. 20, 1963, Ser. No. 332,311
9 Claims. (Cl. 228—56)

The present invention relates to solder rings and to assemblies comprising heat recoverable members and solder rings.

One of the important developments in the field of wire termination and splicing has been the development of heat recoverable members which are provided with a quantity of solder, which members may be caused to change dimension when exposed to a sufficient amount of heat. This heat also operates to cause the solder to become fluid with the result that the heat recoverable member urges the solder toward and into sealing contact with the wire or wires. Such devices are generally described in Wetmore application Serial No. 211,747, filed July 23, 1962, the disclosure of which application is expressly incorporated by reference herein. While these devices have been found to be generally satisfactory, it has also been found that conventional solder structures do not permit as accurate control of the quantity and flow of solder and flux as is desirable for these devices. In addition, it is desirable that the solder structure be so constructed that the flux is located such that it will have the proper flow characteristics and such that the flux is adequately protected from exposure to the atmosphere. Still further, it is desirable that the solder structure provide sufficient means to permit the majority of the flux to escape from the solder when it is heated to a temperature sufficient to cause the flux to flow. In addition, when the solder structure is tubular in shape, it is often particularly desirable that the flow of flux be directed toward the center of the tube.

Several attempts to devise a solder structure having the foregoing characteristics have been made, but none of these have been completely satisfactory. In general, these attempts have involved forming a generally tubular solder ring having a plurality of axial openings along the inner surface thereof which are filled with flux. In addition to not being completely satisfactory in use, these structures have required relatively complicated fabrication equipment and procedures.

Thus, it is a primary object of the present invention to provide a solder structure which may be economically and simply manufactured and which permits accurate control of the quantity and flow of solder and flux.

It is another object of the present invention to provide a flux-cored solder structure wherein the flux is so located that upon heating it flows in the required amount to the correct location.

It is a further object of the present invention to provide heat recoverable articles having flux-cored solder structures of the type described herein.

Other objects and advantages of the present invention, it is believed, will be readily apparent from the following detailed description of specific embodiments thereof when read in connection with the drawings.

Briefly, in its preferred embodiment, the flux-cored solder structure of the present invention comprises a generally tubular structure having at least one cut in the surface thereof. Preferably, the tubular structure is provided with a biased cut near each end of the tubular article. The solder ring of the present invention may be conveniently manufactured by using a flattened strip of flux-cored solder. This strip is first cut along diagonal lines to form an article having a configuration which is generally that of a parallelogram. The strip is then helically wound to form an article having a generally tubular shape and the cut surfaces are pushed towards each other such that they do not substantially protrude from the article.

It is to be understood that the solder ring of the present invention could be manufactured by other methods. For example, a tube of flux-cored solder could be provided with one or more cuts thereon. Preferably, the solder in such a tube completely surrounds the flux except in the area of the cut or cuts.

Referring now to the drawings, FIGURE 1 illustrates a top view of a strip of flux-cored solder which has been diagonally cut at each end in preparation for fabrication of the solder ring of the present invention.

FIGURE 6 illustrates a top view of a strip which has been diagonally cut at each end in preparation for fabrication of another embodiment of the solder ring of the present invention.

FIGURE 7 is a side view of a flux-core solder illustrated in FIGURE 6.

FIGURE 8 illustrates the strip of FIGURE 6 after it has been helically wound.

FIGURE 9 is a cross-sectional illustration of a heat recoverable member which has been provided with the flux-core solder structure illustrated in FIGURE 8.

Figure 1:
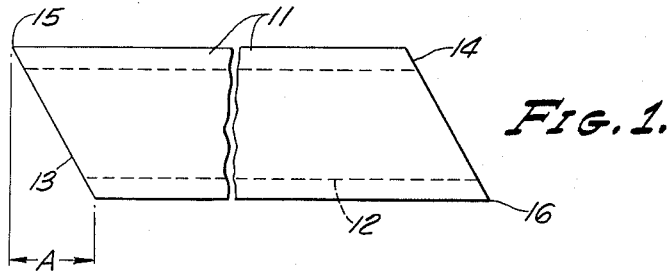
Figure 3:
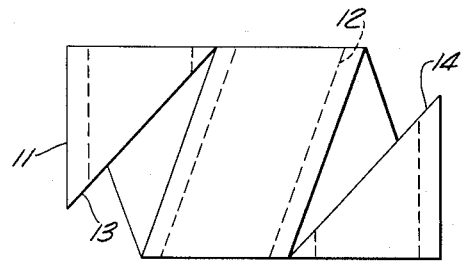
FIGURE 3 illustrates the strip of FIGURE 1 after it has been helically wound.

As shown in FIGURE 1, the solder ring of the present invention may be fabricated by first cutting a flattened strip of solder 11 which is provided with a flux core 12 at ends 13 and 14 such that the strip has the general configuration of a parallelogram. In this embodiment, distance A is one-half the circumference of the strip after it has been helically wound as shown in FIGURE 3. If desired, points 15 and 16 may be rounded or flattened.

Figure 2:
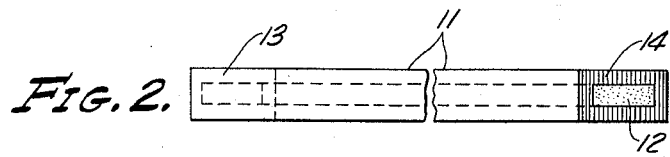
FIGURE 2 is a side view of the flux-cored solder illustrated in FIGURE 1.

As shown in FIGURES 1 and 2, flux core 12 is exposed at ends 13 and 14 but is otherwise surrounded by the solder 11.

The strip is then helically wound as shown in FIGURE 3 such that the exposed flux at ends 13 and 14 is generally directed toward the axial center of the helical winding. Then, as shown in FIGURE 4, ends 13 and 14 are urged toward the center of the helical winding such that these ends no longer protrude and such that the exposed flux at ends 13 and 14 is brought into close proximity with solder 11.

Figure 4:
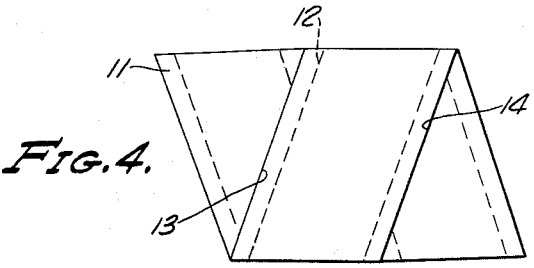
FIGURE 4 illustrates the helically wound strip of FIGURE 3 after the ends thereof have been formed inwardly such that they do not protrude.
Figure 5:
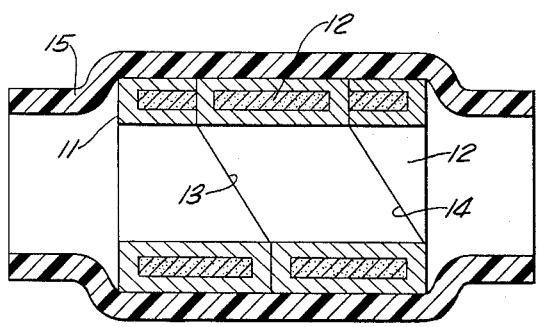
FIGURE 5 is a cross-sectional illustration of a heat-recoverable member which has been provided with the flux-core solder structure illustrated in FIGURE 4.

The formed article shown in FIGURE 4 may then be combined with a heat recoverable member such as member 15 illustrated in FIGURE 5. As is apparent from FIGURE 5, when the article illustrated in this figure is heated to a temperature sufficient to cause the flux 12 to become fluid, the flux will flow out of ends 13 and 14 in a direction generally toward the axial and radial center of the article. Application of sufficient heat will also cause the solder 11 to flow and the recoverable member 15 to change dimension whereby the solder will be urged toward the surface of wires, shielding, etc., positioned within the heat recoverable member and solder ring.

In the embodiment shown in FIGURE 6, the flattened strip of solder 16 which is provided with flux core 17 is cut diagonally at ends 18 and 19 such that the strip has the general configuration of a parallelogram. In this embodiment, the distance B is one-half the total length of the strip, i.e., the distance between points 20 and 21 along a line parallel to the horizontal sides of the strip. If desired, points 20 and 21 may be rounded or flattened. As shown in FIGURES 6 and 7, flux core 17 is exposed at ends 18 and 19, but is otherwise surrounded by solder 16.

The strip is then helically wound as shown in FIGURE 8 such that the exposed flux at ends 18 and 19 is generally directed toward the axial center of the helical winding. After the strip has been helically wound, ends 18 and 19 form substantially parallel helices which extend substantially 360° around the circumference of the winding as shown in FIGURE 8. This assures that a desirable amount of flux will flow along the entire axial length of the winding when the flux is heated to a temperature at which it becomes flowable. In order for optimum flow, it is preferred that ends 18 and 19 be brought into close proximity with each other when the strip is helically wound, but that these ends not touch each other.

The wound article illustrated in FIGURE 8 may then be combined with a heat recoverable member such as member 22 illustrated in FIGURE 9. As is apparent from FIGURE 9, when the article illustrated in this figure is heated to a temperature sufficient to cause the flux 17 to become fluid, the flux will flow out of ends 18 and 19. Application of sufficient heat will also cause the solder 16 to flow and the recoverable member 22 to change dimension whereby the solder will be urged toward the surface of the wires, shielding, etc., positioned within the heat recoverable member and solder ring.

It will be readily apparent to those skilled in the art that the solder rings of the present invention may be fabricated in any desired size. Thus, the quantity of solder and flux may be accurately controlled whereby amounts of these materials which are precisely suitable for a given use may be provided. Furthermore, the flux in the solder rings of the present invention is so located that upon heating it is dispersed into the area between the inside diameter of the solder ring and the surface of the wires, shielding, or other article with which the solder is to be brought into contact. Still further, the solder rings of the present invention are unique in that they substantially protect the flux from exposure to the air while at the same time providing adequate means for effectively dispersing a majority of the flux when the solder rings are heated to a temperature sufficient to cause the flux to become fluid.

An additional advantage of the present invention is that the fabrication technique involving the use of a flattened strip of flux-cored solder makes possible the manufacture of solder rings having a wide variety of dimensions from a single starting material. Thus, this embodiment of the present invention eliminates the necessity for stocking large numbers of solder rings having different lengths and diameters. While the solder rings of the present invention are particularly useful in combination with heat recoverable members, it is to be understood that these solder rings have general utility and are suitable for use in other conventional soldering processes.

Having fully described the present invention, it is to be understood that it is not to be limited to the specific details set forth, but is of the full scope of the appended claims.

I claim:
1. A solder ring comprising a core and a jacket, said core comprising flux and said jacket comprising a solder metal, said ring being substantially tubular in shape and having a cut in the periphery thereof, the walls defining said cut defining a helix which extends substantially 360° around the circumference of said ring, the axial length of said helix being substantially the same as the axial length of said ring.

2. The solder ring of claim 1 wherein said flux is exposed only in the area of said cut.

3. A solder assembly comprising a heat recoverable member and the solder ring recited in claim 1, the solder ring positioned within the heat recoverable member whereby upon application of heat to melt the solder, the heat recoverable member will be urged inwardly.

4. A solder assembly comprising a heat recoverable member and the solder ring recited in claim 2, the solder ring positioned within the heat recoverable member whereby upon application of heat to melt the solder, the heat recoverable member will be urged inwardly.

5. A solder assembly comprising a heat recoverable member and a solder ring, said ring comprising a core and a jacket, said core comprising a flux and said jacket comprising a solder metal, said ring being substantially tubular in shape and having at least one cut in the periphery thereof, the walls defining said cut being such that said flux is exposed, said solder ring positioned within the heat recoverable member whereby upon application of heat to melt the solder, the heat recoverable member will be urged inwardly.

6. The assembly of claim 5 wherein said ring is provided with a cut in the periphery thereof near each end thereof.

7. The assembly of claim 5 wherein said flux is exposed only in the area of said cut or cuts.

8. The assembly of claim 5 wherein the walls defining said cut are such that said flux is generally directed toward the center of the helical windings.

9. The assembly of claim 8 wherein the exposed flux is in close proximity with said jacket.

References Cited by the Examiner

UNITED STATES PATENTS

| | | | |
|---|---|---|---|
| 1,429,703 | 9/1922 | Van Allen | 228—56 |
| 2,790,285 | 4/1957 | Pike et al. | 53—40 |

FOREIGN PATENTS 824,423  12/1951  Germany.

JOHN F. CAMPBELL, *Primary Examiner.*

WHITMORE A. WILTZ, M. L. FAIGUS, *Examiners.*